US009124125B2

(12) United States Patent
Leabman et al.

(10) Patent No.: US 9,124,125 B2
(45) Date of Patent: Sep. 1, 2015

(54) WIRELESS POWER TRANSMISSION WITH SELECTIVE RANGE

(71) Applicant: ENERGOUS CORPORATION, San Jose, CA (US)

(72) Inventors: Michael A. Leabman, San Ramon, CA (US); Gregory Scott Brewer, Livermore, CA (US)

(73) Assignee: Energous Corporation, San Jose, CA (US)

( * ) Notice: Subject to any disclaimer, the term of this patent is extended or adjusted under 35 U.S.C. 154(b) by 168 days.

(21) Appl. No.: 13/926,020

(22) Filed: Jun. 25, 2013

(65) Prior Publication Data
US 2014/0375255 A1 Dec. 25, 2014

(51) Int. Cl.
H02J 7/02 (2006.01)
H02J 17/00 (2006.01)
H04B 5/00 (2006.01)

(52) U.S. Cl.
CPC .................. H02J 7/025 (2013.01); H02J 17/00 (2013.01); H04B 5/00 (2013.01)

(58) Field of Classification Search
CPC ............. H02J 5/005; H02J 17/00; H02J 5/00; H02J 7/025
USPC .......................................................... 320/108
See application file for complete search history.

(56) References Cited

U.S. PATENT DOCUMENTS 5,982,139 A   11/1999 Parise
6,127,799 A   10/2000 Krishnan
6,127,942 A   10/2000 Welle
6,289,237 B1   9/2001 Mickle et al.
6,615,074 B2   9/2003 Mickle et al.
6,798,716 B1   9/2004 Charych
6,856,291 B2   2/2005 Mickle et al.
6,960,968 B2   11/2005 Odendaal et al.
7,003,350 B2   2/2006 Denker et al.
7,027,311 B2   4/2006 Vanderelli et al.
(Continued)

FOREIGN PATENT DOCUMENTS

EP    2545635 A2   1/2013
WO   2004077550 A1   9/2004
(Continued)

OTHER PUBLICATIONS

International Search Report dated Oct. 13, 2014 corresponding to International Patent Application No. PCT/US2014/041534, 4 pages.

Primary Examiner — Suchin Parihar
(74) Attorney, Agent, or Firm — Eric L. Sophir; Dentons US LLP

(57) ABSTRACT

The present disclosure describes a methodology for wireless power transmission based on pocket-forming. This methodology may include one transmitter and at least one or more receivers, being the transmitter the source of energy and the receiver the device that is desired to charge or power. The transmitter may identify and locate the device to which the receiver is connected and thereafter aim pockets of energy to the device in order to power it. Pockets of energy may be generated through constructive and destructive interferences, which may create null-spaces and spots of pockets of energy ranged into one or more radii from transmitter. Such feature may enable wireless power transmission through a selective range, which may limit operation area of electronic devices and/or may avoid formation of pockets of energy near and/or over certain areas, objects and people.

18 Claims, 4 Drawing Sheets

(56) References Cited

U.S. PATENT DOCUMENTS

| | | |
|---|---|---|
| 7,068,991 B2 | 6/2006 | Parise |
| 7,191,013 B1 | 3/2007 | Miranda et al. |
| 7,403,803 B2 | 7/2008 | Mickle et al. |
| 7,451,839 B2 | 11/2008 | Perlman |
| 7,639,994 B2 | 12/2009 | Greene et al. |
| 7,643,312 B2 | 1/2010 | Vanderelli et al. |
| 7,786,419 B2 | 8/2010 | Hyde et al. |
| 7,812,771 B2 | 10/2010 | Greene et al. |
| 7,844,306 B2 | 11/2010 | Shearer et al. |
| 7,868,482 B2 | 1/2011 | Greene et al. |
| 7,898,105 B2 | 3/2011 | Greene et al. |
| 7,925,308 B2 | 4/2011 | Greene et al. |
| 8,099,140 B2 | 1/2012 | Arai |
| 8,115,448 B2 | 2/2012 | John |
| 8,159,090 B2 | 4/2012 | Greene et al. |
| 8,159,364 B2 | 4/2012 | Zeine |
| 8,180,286 B2 | 5/2012 | Yamasuge |
| 8,380,255 B2 | 2/2013 | Shearer et al. |
| 8,410,953 B2 | 4/2013 | Zeine |
| 8,432,062 B2 | 4/2013 | Greene et al. |
| 8,446,248 B2 | 5/2013 | Zeine |
| 8,447,234 B2 | 5/2013 | Cook et al. |
| 8,461,817 B2 | 6/2013 | Martin et al. |
| 8,558,661 B2 | 10/2013 | Zeine |
| 8,621,245 B2 | 12/2013 | Shearer et al. |
| 8,854,176 B2 | 10/2014 | Zeine |
| 8,897,770 B1 * | 11/2014 | Frolov et al. .................. 455/431 |
| 9,000,616 B2 | 4/2015 | Greene et al. |
| 9,021,277 B2 | 4/2015 | Shearer et al. |
| 2006/0238365 A1 | 10/2006 | Vecchione et al. |
| 2006/0284593 A1 | 12/2006 | Nagy et al. |
| 2007/0060185 A1 | 3/2007 | Simon et al. |
| 2007/0178945 A1 | 8/2007 | Cook et al. |
| 2010/0027379 A1 | 2/2010 | Saulnier et al. |
| 2010/0194206 A1 | 8/2010 | Burdo et al. |
| 2010/0315045 A1 | 12/2010 | Zeine |
| 2011/0074342 A1 | 3/2011 | MacLaughlin |
| 2011/0115303 A1 | 5/2011 | Baarman et al. |
| 2011/0181120 A1 * | 7/2011 | Liu et al. ..................... 307/104 |
| 2011/0281535 A1 | 11/2011 | Low et al. |
| 2011/0282415 A1 | 11/2011 | Eckhoff et al. |
| 2012/0157019 A1 | 6/2012 | Li |
| 2012/0193999 A1 | 8/2012 | Zeine |
| 2012/0248891 A1 * | 10/2012 | Drennen ..................... 307/104 |
| 2012/0299540 A1 | 11/2012 | Perry |
| 2012/0299541 A1 | 11/2012 | Perry |
| 2012/0299542 A1 | 11/2012 | Perry |
| 2012/0300588 A1 | 11/2012 | Perry |
| 2012/0300592 A1 | 11/2012 | Perry |
| 2012/0300593 A1 | 11/2012 | Perry |
| 2012/0326660 A1 * | 12/2012 | Lu et al. ..................... 320/108 |
| 2013/0024059 A1 | 1/2013 | Miller et al. |
| 2013/0207604 A1 | 8/2013 | Zeine |
| 2013/0241468 A1 | 9/2013 | Moshfeghi |
| 2013/0241474 A1 | 9/2013 | Moshfeghi |
| 2014/0035524 A1 | 2/2014 | Zeine |
| 2014/0049422 A1 * | 2/2014 | Von Novak et al. ......... 342/146 |
| 2014/0062395 A1 * | 3/2014 | Kwon et al. .................. 320/108 |
| 2014/0217967 A1 | 8/2014 | Zeine et al. |
| 2014/0241231 A1 | 8/2014 | Zeine |
| 2014/0265725 A1 | 9/2014 | Angle et al. |
| 2014/0265727 A1 | 9/2014 | Berle |
| 2014/0265943 A1 | 9/2014 | Angle et al. |
| 2014/0281655 A1 | 9/2014 | Angle et al. |
| 2014/0354063 A1 * | 12/2014 | Leabman et al. ............ 307/104 |
| 2014/0368048 A1 * | 12/2014 | Leabman et al. ............ 307/104 |
| 2015/0015194 A1 * | 1/2015 | Leabman et al. ............ 320/108 |
| 2015/0015195 A1 * | 1/2015 | Leabman et al. ............ 320/108 |
| 2015/0022010 A1 * | 1/2015 | Leabman et al. ............ 307/104 |
| 2015/0102681 A1 * | 4/2015 | Leabman et al. ............ 307/104 |
| 2015/0102769 A1 * | 4/2015 | Leabman et al. ............ 320/108 |

FOREIGN PATENT DOCUMENTS

| | | |
|---|---|---|
| WO | 2003091943 A1 | 11/2006 |
| WO | WO2010022181 A1 | 2/2010 |

* cited by examiner

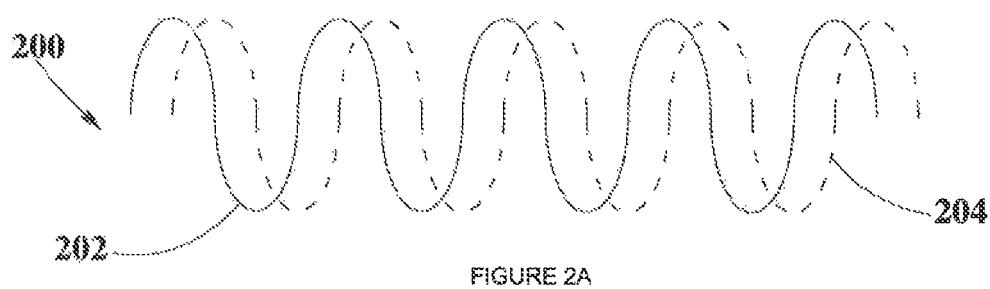
FIGURE 2A
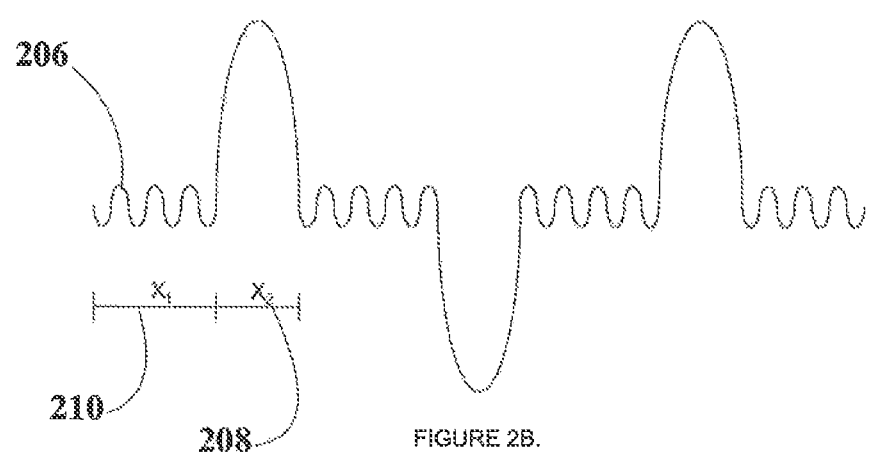
FIGURE 2B.
FIG. 2

WIRELESS POWER TRANSMISSION WITH SELECTIVE RANGE

CROSS-REFERENCES TO RELATED APPLICATIONS

The present disclosure is related to Non-Provisional patent application Ser. No. 13/891,430, filed May 10, 2013, entitled Methodology for Pocket-Forming, the entire content of which is incorporated herein by this reference.

FIELD OF INVENTION

The present disclosure relates to electronic transmitters. and more particularly to transmitters for wireless power transmission.

BACKGROUND OF THE INVENTION

Electronic devices such as laptop computers, smartphones, portable gaming devices, tablets and so forth may require power for performing their intended functions. This may require having to charge electronic equipment at least once a day, or in high-demand electronic devices more than once a day. Such an activity may be tedious and may represent a burden to users, For example, a user may be required to carry chargers in case his electronic equipment is lacking power. In addition, users have to find available power sources to connect to. Lastly, users must plugin to a wall or other power supply to be able to charge his or her electronic device. However, such an activity may render electronic devices inoperable during charging. Current solutions to this problem may include inductive pads which may employ magnetic induction or resonating coils. Nevertheless, such a solution may still require that electronic devices may have to be placed in a specific place for powering. Thus, electronic devices during charging may not be portable. For the foregoing reasons, there is a need for a wireless power transmission system where electronic devices may be powered without requiring extra chargers or plugs, and where the mobility and portability of electronic devices may not be compromised.

SUMMARY OF THE INVENTION

The present disclosure provides various transmitter arrangements which can be utilized for wireless power transmission using suitable techniques such as pocket-forming. Transmitters may be employed for sending Radio frequency (RF) signals to electronic devices which may incorporate receivers. Such receivers may convert RF signals into suitable electricity for powering and charging a plurality of electric devices. Wireless power transmission allows powering and charging a plurality of electrical devices without wires.

A transmitter including at least two antenna elements may generate RF signals through the use of one or more Radio frequency integrated circuit (RFIC) which may be managed by one or more microcontrollers. Transmitters may receive power from a power source, which may provide enough electricity for a subsequent conversion to RF signal.

Wireless power transmission with selective range may be employed for charging or powering a plurality of electronic devices in a variety of spots into a variety of ranges, such spots may be surrounded by null-spaces where no pockets of energy are generated, thus, wireless power transmission may be used in applications Where pockets of energy are not desired, such applications may include sensitive equipment to pocket-forming or pockets of energy as well as people, who do not want pockets of energy near or over them. Furthermore, wireless power transmission with selective range may increase control over devices which receive charge or power, such control may be applied for limiting the operation area of certain equipment, such as, exhibition cellphones, exhibition tablets and any other suitable device that may be required to operate into a limited zone.

BRIEF DESCRIPTION OF THE DRAWINGS

Non-limiting embodiments of the present disclosure are described by way of example with reference to the accompanying figures which are schematic and may not be drawn to scale. Unless indicated as representing the background art, the figures represent aspects of the disclosure.

FIG. 2 illustrates waveforms for wireless power transmission with selective range, which may get unified in single waveform.

DETAILED DESCRIPTION OF THE DRAWINGS

Figure 1:
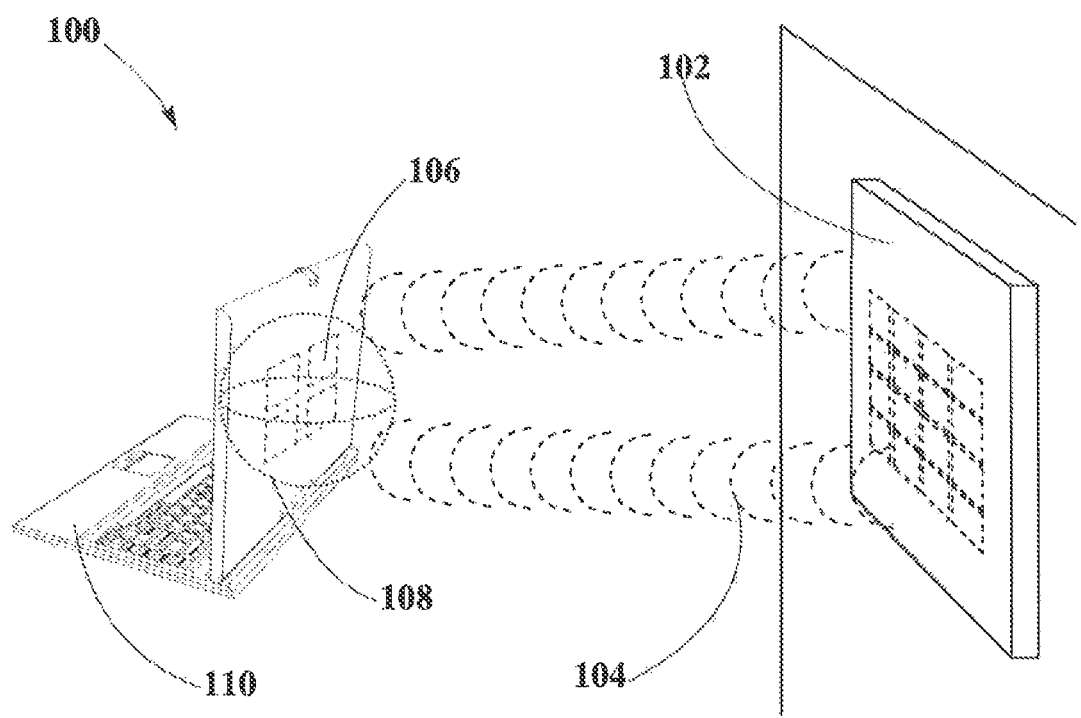
FIG. 1 illustrates a wireless power transmission example situation using pocket-forming.

"Pocket-forming" may refer to generating two or more RF waves which converge in 3-d space, forming controlled constructive and destructive interference patterns.

"Pockets of energy" may refer to areas or regions of space where energy or power may accumulate in the form of constructive interference patterns of RF waves.

"Null-space" may refer to areas or regions of space where pockets of energy do not form because of destructive interference patterns of RF waves.

"Transmitter" may refer to a device, including a chip which may generate two or more RF signals, at least one RF signal being phase shifted and gain adjusted with respect to other RF signals, substantially all of which pass through one or more RF antenna such that focused RE signals are directed to a target.

"Receiver" may refer to a device including at least one antenna element, at least one rectifying circuit and at least one power converter, which may utilize pockets of energy for powering, or charging an electronic device.

"Adaptive pocket-forming" may refer to dynamically adjusting pocket-forming to regulate power on one or more targeted receivers.

DESCRIPTION OF THE DRAWINGS

In the following detailed description, reference is made to the accompanying drawings, which form a part hereof. In the drawings, which are not to scale or to proportion, similar symbols typically identify similar components, unless context dictates otherwise. The illustrative embodiments described in the detailed description, drawings and claims, are not meant to be limiting. Other embodiments may be used and/or and other changes may be made without departing from the spirit or scope of the present disclosure.

FIG. 1 illustrates wireless power transmission 100 using pocket-forming. A transmitter 102 may transmit controlled Radio RF waves 104 which may converge in 3-d space. These Radio frequencies (RF) waves may be controlled through phase and/or relative amplitude adjustments to form constructive and destructive interference patterns (pocket-forming). Pockets of energy 108 may be formed at constructive interference patterns and can be 3-dimensional in shape whereas null-spaces may be generated at destructive interference patterns. A receiver 106 may then utilize pockets of energy 108 produced by pocket-forming for charging or powering an electronic device, for example a laptop computer 110 and thus effectively providing wireless power transmission. In other situations there can be multiple transmitters 102 and/or multiple receivers 106 for powering various electronic equipment for example smartphones, tablets, music players, toys and others at the same time. In other embodiments, adaptive pocket-forming may be used to regulate power on electronic devices.

FIG. 2 depicts a wireless power transmission principle 200, where two waveforms, for example waveform 202 and waveform 204, as depicted in FIG. 2A may result in a unified waveform 206 as depicted in FIG. 2B. Such unified waveform 206 may be generated by constructive and destructive interference patterns between waveform 202 and waveform 204.

As depicted in FIG. 2A, at least two waveforms with slightly different frequencies such as waveform 202 and waveform 204 may be generated at 5.7 Gigahertz (GHz) and 5.8 GHz respectively. By changing the phase on one or both frequencies using suitable techniques such as pocket-forming, constructive and destructive interferences patterns may result in unified waveform 206. Unified waveform 206 may describe pockets of energy 108 and null-spaces along pocket-forming, such pockets of energy 108 may be available in certain areas where a constructive interference exists; such areas may include one or more spots which may move along pocket-forming trajectory and may be contained into wireless power range 208 $X_1$. Wireless power range 208 $X_1$ may include a minimum range and a maximum range of wireless power transmission 100, which may range from a few centimeters to over hundreds of meters. In addition, unified waveforms 206 may include several null-spaces, which may be available in certain areas where a destructive interference exists, such areas may include one or more null-spaces which may move along pocket-forming trajectory and may be contained into wireless power range 210 $X_2$. Wireless power range 210 $X_2$ may include a minimum range and a maximum range of wireless power transmission 100, which may range from a few centimeters to over hundreds of meters.

Figure 3:
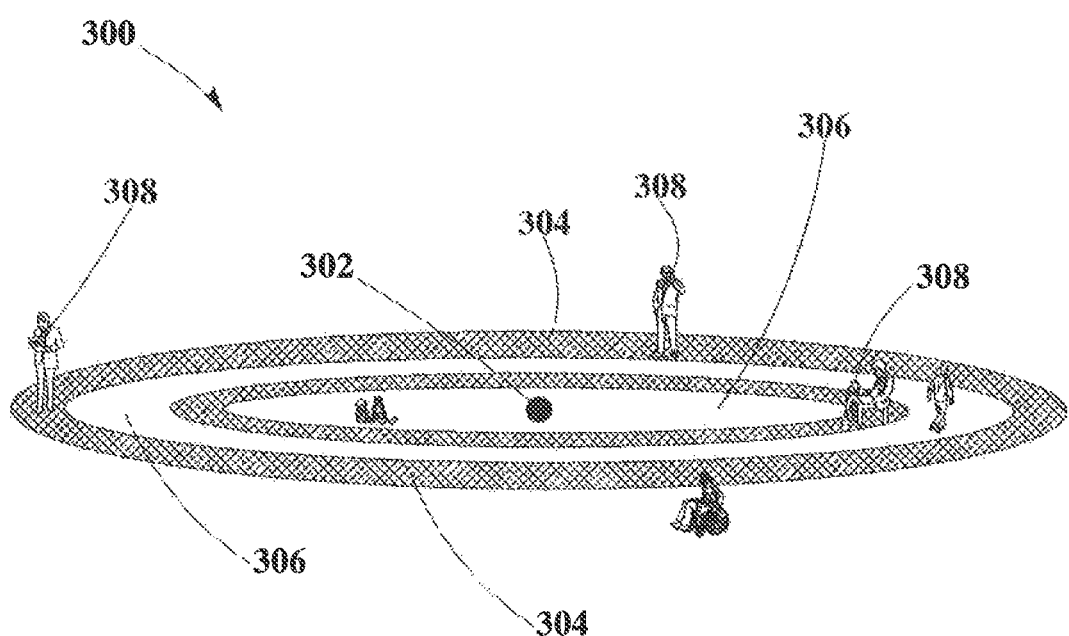
FIG. 3 illustrates wireless power transmission with selective range, where a plurality of pockets of energy may be generated along various radii from transmitter.

FIG. 3 depicts wireless power transmission with selective range 300, where a transmitter 302 may produce pocket-forming for a plurality of receivers 308. Transmitter 302 may generate pocket-forming through wireless power transmission with selective range 300, which may include one or more wireless charging radii 304 and one or more radii of null-space 306. A plurality of electronic devices may be charged or powered in wireless charging radii 304. Thus, several spots of energy may be created, such spots may be employed for enabling restrictions for powering and charging electronic devices, such restrictions may include: Operation of specific electronics in a specific or limited spot contained in wireless charging radii 304. Furthermore, safety restrictions may be implemented by the use of wireless power transmission with selective range 300, such safety restrictions may avoid pockets of energy 108 over areas or zones where energy needs to be avoided, such areas may include areas including sensitive equipment to pockets of energy 108 and/or people Which do not want pockets of energy 108 over and/or near them.

Figure 4:
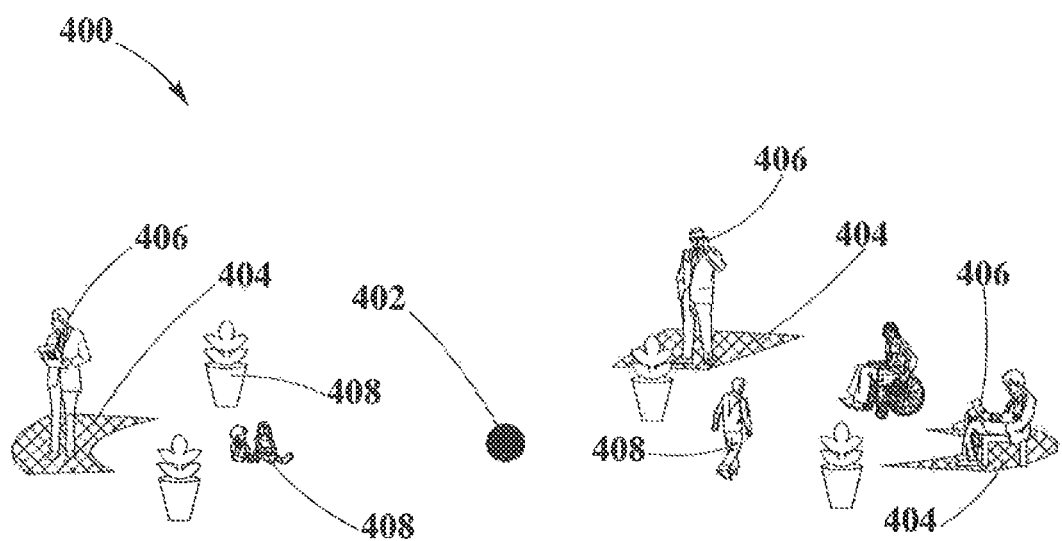
FIG. 4 illustrates wireless power transmission with selective range, where a plurality of pockets of energy may be generated along various radii from transmitter.

FIG. 4 depicts wireless power transmission with selective range 400, where a transmitter 402 may produce pocket-forming for a plurality of receivers 406. Transmitter 402 may generate pocket-forming through wireless power transmission with selective range 400, which may include one or more wireless charging spots 404. A plurality of electronic devices may be charged or powered in wireless charging spots 404. Pockets of energy 108 may be generated over a plurality of receivers 406 regardless the obstacles 408 surrounding them, such effect may be produced because destructive interference may be generated in zones or areas where obstacles 408 are present. Therefore, pockets of energy 108 may be generated through constructive interference in wireless charging spots 404. Location of pockets of energy 108 may be performed by tacking receivers 406 and by enabling a plurality of communication protocols by a variety of communication systems such as, Bluetooth technology, infrared communication, WI-FI, FM radio among others.

While various aspects and embodiments have been disclosed herein, other aspects and embodiments may be contemplated. The various aspects and embodiments disclosed herein are for purposes of illustration and are not intended to be limiting, with the true scope and spirit being indicated by the following claims.

Having thus described the invention, we claim:

1. A method for wireless power transmission with selective range to power a portable electronic device, comprising:
    generating pocket-forming RF waves from a transmitter through an antenna connected to the transmitter;
    accumulating pockets of energy in regions of space in the form of constructive interference patterns of the generated RF waves;
    employing a selective range for charging or powering the electronic device in a predetermined variety of spots with the accumulated pockets of energy surrounded by null-spaces without accumulated pockets of energy; and
    implementing an adaptive power focusing to avoid obstacles interfering with the RF signals between the receiver and the transmitter for regulating two or more receivers providing charging or powering of the portable electronic device.

2. The method for wireless power transmission with selective range to power the portable electronic device of claim 1, further including the method of intercepting the accumulated pockets of energy in regions of space by a receiver with a RF antenna connected to the portable electronic device.

3. The method for wireless power transmission with selective range to power the portable electronic device of claim 2, further including the method of rectifying the RF waves in the accumulated pockets of energy and converting the rectified RF waves into a constant DC voltage for charging or powering the portable electronic device.

4. A method for wireless power transmission with selective range to power a portable electronic device, comprising:
    generating pocket-forming RF waves from a transmitter through an antenna connected to the transmitter;
    accumulating pockets of energy in regions of space in the form of constructive interference patterns of the generated RF waves; and
    employing a selective range for charging or powering the electronic device in a predetermined variety of spots with the accumulated pockets of energy surrounded by null-spaces without accumulated pockets of energy,
    wherein the null-spaces are generated in the form of destructive interference patterns of the generated RF waves and the null-spaces are distributed in predetermined selective zones around the variety of spots.

5. A method for wireless power transmission with selective range to power a portable electronic device, comprising:

generating pocket-forming RF waves from a transmitter through an antenna connected to the transmitter;

accumulating pockets of energy in regions of space in the form of constructive interference patterns of the generated RF waves; and employing a selective range for charging or powering the electronic device in a predetermined variety of spots with the accumulated pockets of energy surrounded by null-spaces without accumulated pockets of energy, wherein the employing the selective range increases control over electronic devices to receive charging by limiting the operation area of certain portable electronic devices to eliminate pockets of energy in sensitive areas including people or other equipment affected by pockets of energy.

6. The system for wireless power transmission with selective range to power the portable electronic device of claim 5, wherein the transmitter provides pocket-forming for a plurality of receivers including one or more wireless charging radii surrounded by one or more radii of null-space to create spots enabling restrictions for powering and charging electronic devices.

7. A system for wireless power transmission with selective range to power a portable electronic device, comprising:

a transmitter for generating pocket-forming at least two RF waves through an antenna connected to the transmitter;

a micro-controller within the transmitter for controlling the pocket-forming the at least two RF waves to accumulate pockets of energy in regions of space in the form of constructive interference patterns of the generated RF waves; and a selective range for charging or powering the electronic device in a predetermined variety of spots in regions of space with the accumulated pockets of energy surrounded by null-spaces without accumulated pockets of energy, wherein the micro-controller changes a phase on one or more RF waves in pocket-forming with constructive and destructive interference patterns resulting in a unified waveform in the predetermined variety of spots for charging the electronic device.

8. The system for wireless power transmission with selective range to power the portable electronic device of claim 7, wherein the unified waveform defines pockets of energy and null-spaces along pocket-forming whereby the pockets of energy are available in certain predetermined regions of space where constructive interference exists defining one or more hot spots for charging the electronic devices over a minimum or maximum selected range responsive to a program within the micro-controller.

9. The system for wireless power transmission with selective range to power the portable electronic device of claim 7, wherein the unified waveform is comprised of at least two RF waves with slightly different frequencies with phase shifting on one or both frequencies to form a wireless power range from a few centimeters to over hundreds of meters.

10. A system for wireless power transmission with selective range to power a portable electronic device, comprising:

a transmitter for generating at least two RF waves and short RF control signals having at least two RF antennas to transmit at least two RF waves through the antennas converging in 3-d space to accumulate as pockets of energy in the form of constructive interference patterns of RF waves;

a micro-controller within the transmitter for controlling constructive interference patterns of the RF waves to accumulate pockets of energy in predetermined areas or regions in 3-D space and for controlling the destructive interference patterns of the RF waves to form null-spaces surrounding the pockets of energy, wherein the constructive interference patterns of RF waves form charging hot spots of a predetermined selected range for charging portable electronic devices and wherein the destructive interference patterns of RF waves form null spots of a predetermined selected range surrounding the charging spots without charging energy therein, and wherein the hot spots include one or more wireless charging radii and one or more null-space radii whereby the hot spots are created for enabling restrictions for powering and charging the electronic device.

11. The system for wireless power transmission with selective range to power the portable electronic device of claim 10, wherein the antennas operate in frequency bands of generally 900 MHz, 2.4 GHz or 5.7 GHz bands.

12. The system for wireless power transmission with selective range to power the portable electronic device of claim 10, wherein selected range of charging spots provide safety restrictions to eliminate pockets of energy over areas or zones where energy is avoided to protect sensitive equipment or people within predetermined designated regions in 3-d space.

13. A system for wireless power transmission with selective range to power a portable electronic device, comprising:

a transmitter for generating at least two RF waves and short RF control signals having at least two RF antennas to transmit at least two RF waves through the antennas converging in 3-d space to accumulate as pockets of energy in the form of constructive interference patterns of RF waves;

a micro-controller within the transmitter for controlling constructive interference patterns of the RF waves to accumulate pockets of energy in predetermined areas or regions in 3-D space and for controlling the destructive interference patterns of the RF waves to form null-spaces surrounding the pockets of energy, wherein the constructive interference patterns of RF waves form charging hot spots of a predetermined selected range for charging portable electronic devices and wherein the destructive interference patterns of RF waves form null spots of a predetermined selected range surrounding the charging spots without charging energy therein, and further including a receiver connected to the portable electronic device having a micro-controller to communicate with the transmitter micro-controller to generate wireless charging spots over a plurality of receivers regardless of the obstacles surrounding the receivers for the predetermined selected range from the transmitter.

14. The system for wireless power transmission with selective range to power the portable electronic device of claim 13, wherein the micro-controllers for the transmitter and receiver locate, track or direct the pockets of energy over preselected range of hot spots by enabling a plurality of standard wireless communication protocols of Bluetooth, Wi-Fi, FM or Zigbee.

15. The system for wireless power transmission with selective range to a portable electronic device of claim 13, wherein the micro-controllers of the transmitter and receiver are dynamically adjusting pocket-forming over preselected ranges to regulate power on one or more targeted receivers.

16. The system for wireless power transmission with selective range to power the portable electronic device of claim 13, wherein the receiver and transmitter micro-controllers communicate to change frequencies and phase on one or more RF waves to form an unified waveform that describes pockets of energy and mill-spaces along pocket-forming wherein pockets of energy are available in certain predetermined areas where a constructive interference of the waves exist and such areas include one or more spots which move along pocket-forming trajectory and contained within the wireless power range that include either a minimum or maximum range of wireless power transmission.

17. The system for wireless power transmission with selective range to power the portable electronic device of claim 13, wherein the electronic devices are various electronic equipment, smartphones, tablets, music players, computers, toys and others powered at the same time over selected ranges and restricted locations for each electronic device.

18. A system for wireless power transmission with selective range to power a portable electronic device, comprising:

a transmitter for generating at least two RF waves and short RF control signals having at least two RF antennas to transmit at least two RF waves through the antennas converging in 3-d space to accumulate as pockets of energy in the form of constructive interference patterns of RF waves;

a micro-controller within the transmitter for controlling constructive interference patterns of the RF waves to accumulate pockets of energy in predetermined areas or regions in 3-D space and for controlling the destructive interference patterns of the RF waves to form null-spaces surrounding the pockets of energy, wherein the constructive interference patterns of RF waves form charging hot spots of a predetermined selected range for charging portable electronic devices and wherein the destructive interference patterns of RF waves form null spots of a predetermined selected range surrounding the charging spots without charging energy therein, and wherein the antennas operate in predetermined frequencies at generally 900 MHz, 2.4 GHz, 5.7 GHz to transmit at least two RF waveforms to create a unified waveform for a preselected range for charging hot spots and null-space spots.

* * * * *